(12) United States Patent
Faass et al.

(10) Patent No.: US 7,771,126 B2
(45) Date of Patent: Aug. 10, 2010

(54) RADIALLY COMPLIANT BEARING HANGER FOR ROTATING SHAFTS

(75) Inventors: Robert L. Faass, Utica, NY (US); Jeffrey L. Mathis, Clinton, NY (US)

(73) Assignee: Goodrich Corporation, Charlotte, NC (US)

( * ) Notice: Subject to any disclaimer, the term of this patent is extended or adjusted under 35 U.S.C. 154(b) by 508 days.

(21) Appl. No.: 11/592,570

(22) Filed: Nov. 3, 2006

(65) Prior Publication Data

US 2009/0067767 A1    Mar. 12, 2009

(51) Int. Cl.
F16C 27/00    (2006.01)
F16M 13/00    (2006.01)

(52) U.S. Cl. .................... 384/535; 248/580

(58) Field of Classification Search ............. 384/535, 384/536, 581, 582; 180/379–382; 248/560, 248/562, 565, 575, 576, 580, 609; 267/140.11, 267/140.13, 140.02, 141.1, 195, 196, 201, 267/202, 203, 214, 216; 464/178

See application file for complete search history.

(56) References Cited

U.S. PATENT DOCUMENTS

| | | | | |
|---|---|---|---|---|
| 1,510,303 A | * | 9/1924 | Bugatti | 384/535 |
| 2,163,425 A | * | 6/1939 | Emerson | 451/441 |
| 2,540,997 A | * | 2/1951 | Schmitter | 464/33 |
| 3,095,248 A | * | 6/1963 | Lindgren | 384/536 |
| 3,097,022 A | * | 7/1963 | Sernetz | 384/536 |
| 3,362,760 A | | 1/1968 | Sernetz | |
| 3,649,985 A | * | 3/1972 | Hunt | 15/179 |
| 3,923,349 A | * | 12/1975 | Herbst | 384/215 |
| 4,908,929 A | | 3/1990 | Fazi, Jr. et al. | |
| 6,168,530 B1 | * | 1/2001 | Guimbal et al. | 464/178 |
| 6,289,640 B1 | * | 9/2001 | Ueda et al. | 52/167.9 |

FOREIGN PATENT DOCUMENTS

| | | |
|---|---|---|
| DE | 4404311 C1 | 4/1995 |
| GB | 2120740 A | 12/1983 |
| WO | WO-9942221 A1 | 8/1999 |

OTHER PUBLICATIONS

European Search Report for EP0702947, dated Apr. 15, 2010.

* cited by examiner

*Primary Examiner*—Thomas R Hannon
*Assistant Examiner*—James Pilkington
(74) *Attorney, Agent, or Firm*—Scott D. Wofsy; Joshua L. Jones; Edwards Angell Palmer & Dodge LLP

(57) ABSTRACT

A bearing hanger assembly for supporting a shaft is disclosed which includes a support plate having front and rear surfaces and a shaft aperture, a damper plate having front and rear surfaces and a shaft aperture, and a damper element disposed between the front surface of the support plate and the rear surface of the damper plate. The damper element has a bearing aperture axially aligned with the shaft apertures of the support plate and damper plate, and is adapted to translate relative to the damper plate and support plate to accommodate radial movement of a shaft supported in the bearing aperture.

20 Claims, 8 Drawing Sheets

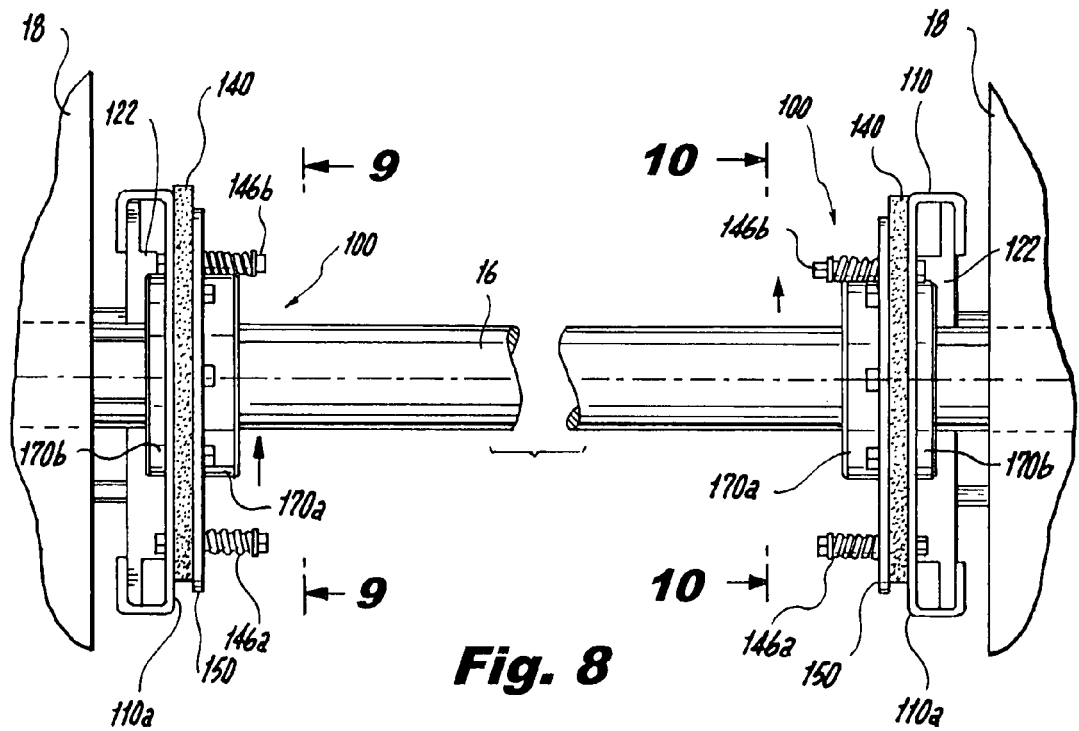
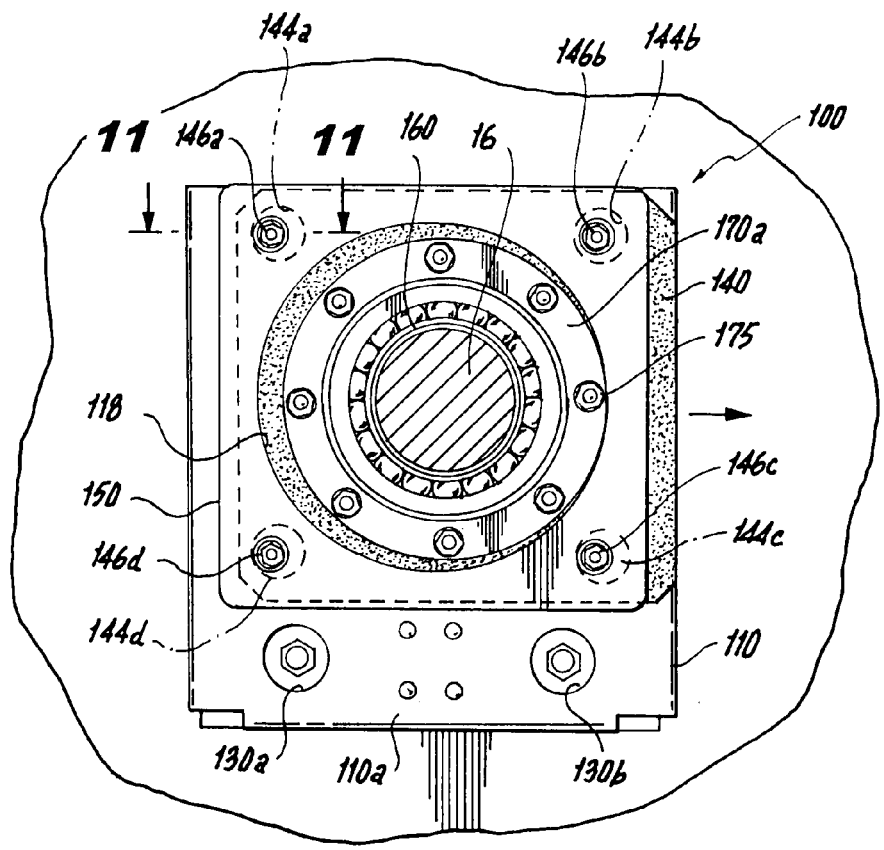

RADIALLY COMPLIANT BEARING HANGER FOR ROTATING SHAFTS

BACKGROUND OF THE INVENTION

1. Field of the Invention

The subject invention is directed to a bearing hanger assembly for a drive shaft, and more particularly, to a radially compliant bearing hanger assembly for use in an aircraft or industrial drive system.

2. Description of Related Art

Bearing hangers for supporting rotating drive shafts are typically utilized in aircraft and industrial drive systems. In aircraft, bearing hangers are often used in a section of an airframe that is folded into a stowage position for shipping or storage, such as the tail section of a helicopter. In these applications, a rotating shaft, such as the drive shaft of a tail rotor assembly, can experience radial, axial or angular misalignment when the tail section is reassembled into an operational position.

There are several types of bearing hangers known in the art to accommodate radial, axial and/or angular misalignment of rotating shafts. These include, for example, spherical bearing elements, elastomeric bearing elements and visco-elastic bearing elements. A spherical bearing element is often used to directly attach a bearing hanger to an airframe or bulkhead structure to accommodate misalignment of a shaft. Spherical bearing elements are well suited to accommodate angular misalignment, but they are incapable of accommodating radial misalignment of a drive shaft. In contrast, elastomeric and visco-elastic bearing elements are designed to accommodate radial, axial and angular misalignment. However, elastomeric and visco-elastic bearing elements are susceptible to fatigue failure over time due to continuing flexure stress.

It would be beneficial therefore to provide a bearing hanger assembly for a rotating drive shaft that can accommodate radial, axial and angular misalignment, while not being susceptible to fatigue failure caused by repetitive flexure.

SUMMARY OF THE INVENTION

The subject invention is directed to a new and useful radially compliant bearing hanger assembly for supporting a shaft, such as, for example, a rotating drive shaft in the tail section of a helicopter. The bearing hanger assembly of the subject invention includes a support plate having front and rear surfaces and a shaft aperture, a damper plate having front and rear surfaces and a shaft aperture, and a damper element disposed between the front surface of the support plate and the rear surface of the damper plate. The damper element has a bearing aperture that is axially aligned with the shaft apertures of the support plate and damper plate. The damper element is adapted and configured to translate relative to the damper plate and support plate to accommodate radial movement of a shaft supported in the bearing aperture. Preferably, the damper element is formed from a self-lubricating polymeric material, such as, for example, polytetrafluoroethylene (PTFE).

The bearing hanger assembly further includes an anti-friction bearing mounted to the damper element within the bearing aperture of the damper element for supporting rotational motion of the shaft. The anti-frictional bearing preferably has a flat running surface and can have a spherical outer diameter seated in a manner to accommodate angular movement of a shaft supported therein. In a preferred embodiment of the subject invention, the anti-frictional bearing is a ball or roller bearing assembly. The roller bearing assembly includes an inner race and an outer race, and preferably the inner race is adapted and configured to move relative to the outer race to accommodate angular movement of a shaft supported therein.

The bearing hanger assembly further includes means for selectively adjusting resistance of the damper plate to radial movement. Preferably, the means for selectively adjusting resistance includes a plurality of spring loaded threaded fasteners or a similar adjustable fastening mechanism. The bearing hanger assembly further includes means for mounting the support plate to a supporting structure, such as a bulkhead in the airframe of a helicopter. Preferably, the mounting means includes spherical bearing means for accommodating movement of the support plate relative to a supporting structure. The mounting further includes a mounting block fastened to the support plate and adapted to retain the spherical bearing means.

These and other features of the bearing hanger assembly of the subject invention will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the bearing hanger of the subject invention without undue experimentation, preferred embodiments thereof will be described in detail hereinbelow with reference to certain figures, wherein:

FIG. 8 is a top plan view of the bearing hangers illustrated in FIG. 2, wherein the damper elements of the two bearing hangers are shifted to accommodate radial misalignment of the drive shaft;

FIG. 9 is a plan view taken along line 9-9 of FIG. 8, illustrating the orientation of the damper element when the drive shaft is radially misaligned as in FIG. 8;

DETAILED DESCRIPTION OF PREFERRED EMBODIMENTS

Figure 1:
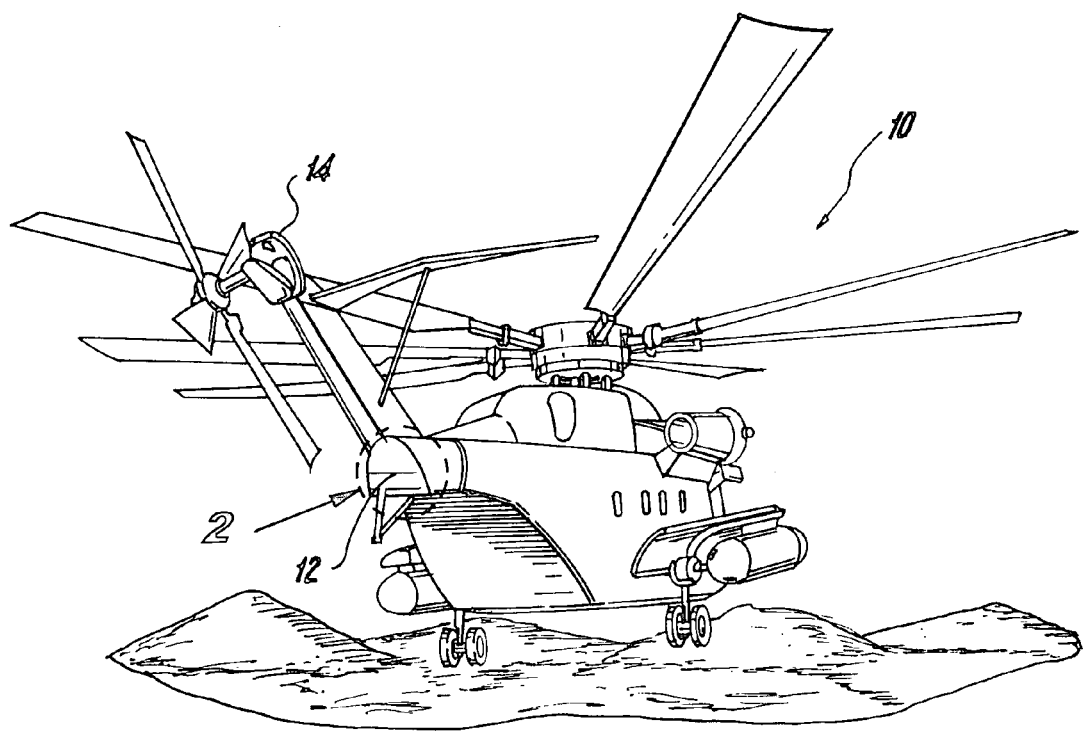
FIG. 1 is an illustration of a helicopter showing an approximate location in the airframe wherein the radially compliant bearing hanger of the subject invention is employed to support a rotating drive shaft.
Figure 2:
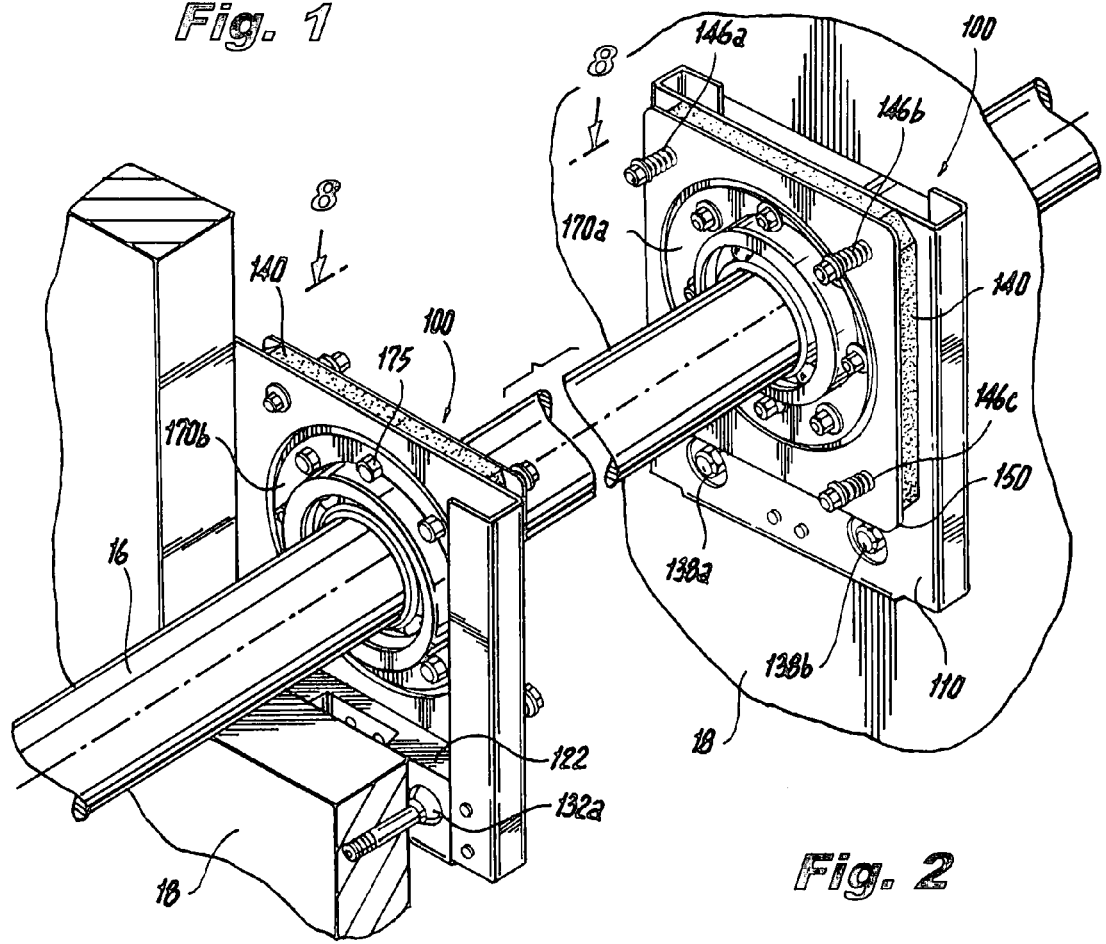
FIG. 2 is a perspective view of an interior section of the tail section of the helicopter shown in FIG. 1, depicting two of the radially compliant bearing hangers of the subject invention supporting a drive shaft.

Referring now to the drawings wherein like reference numerals identify similar features or elements of the various embodiments of the subject invention disclosed herein, there is illustrated in FIG. 1 a helicopter 10 having a foldable tail section 12 in which the radially compliant bearing hanger 100 of the subject invention is employed to support a drive shaft associated with the tail rotor assembly 14, as shown in FIG. 2.

Referring to FIG. 2, there is illustrated a drive shaft 16 supported by two spaced apart bearing hangers, each designated generally by reference numeral 100, which are independently mounted to respective bulkhead structures 18 in the tail section 12 of helicopter 10. In accordance with the subject invention, bearing hangers 100 are configured to accommodate radial, axial and/or angular movement of the shaft 16. More particularly, the bearing hangers 100 are adapted to accommodate radial, axial and/or angular misalignment of the shaft 16, which can occur when the tail section 12 of the helicopter 10 is articulated into an operational position after being stowed in a folded orientation.

Figure 3:
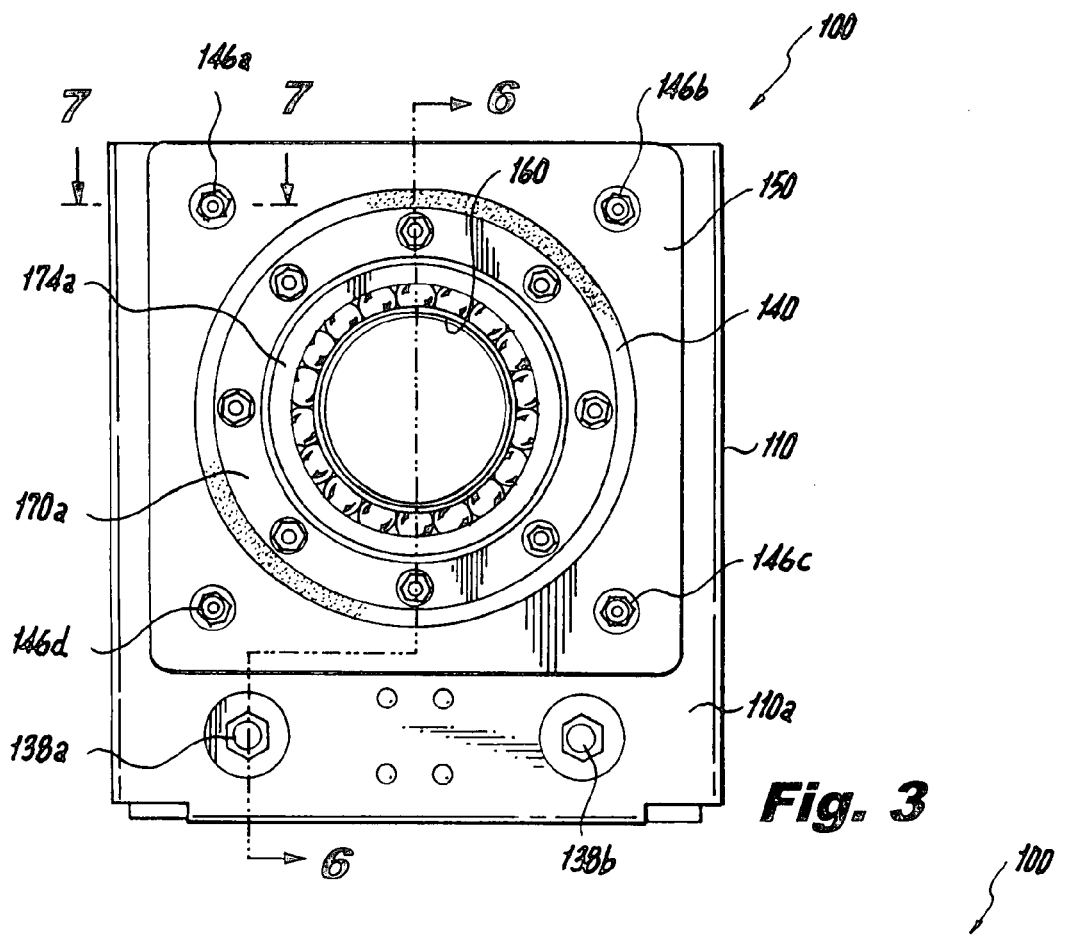
FIG. 3 is a front elevational view of the radially compliant bearing hanger of the subject invention.
Figure 4:
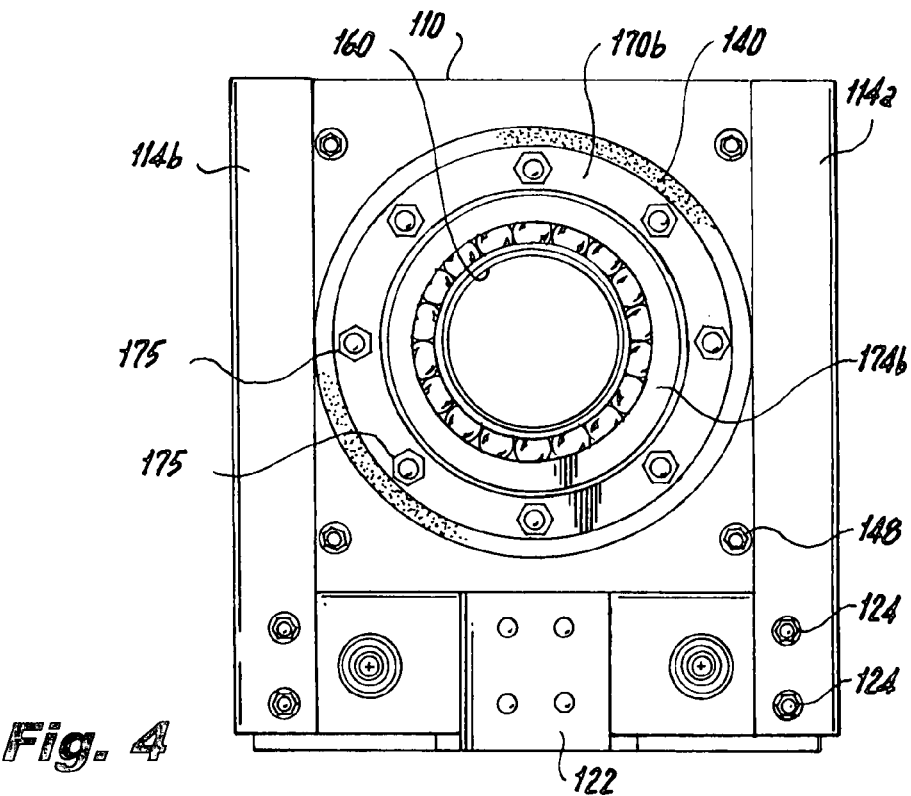
FIG. 4 is a rear elevational view of the radially compliant bearing hanger of the subject invention.
Figure 5:
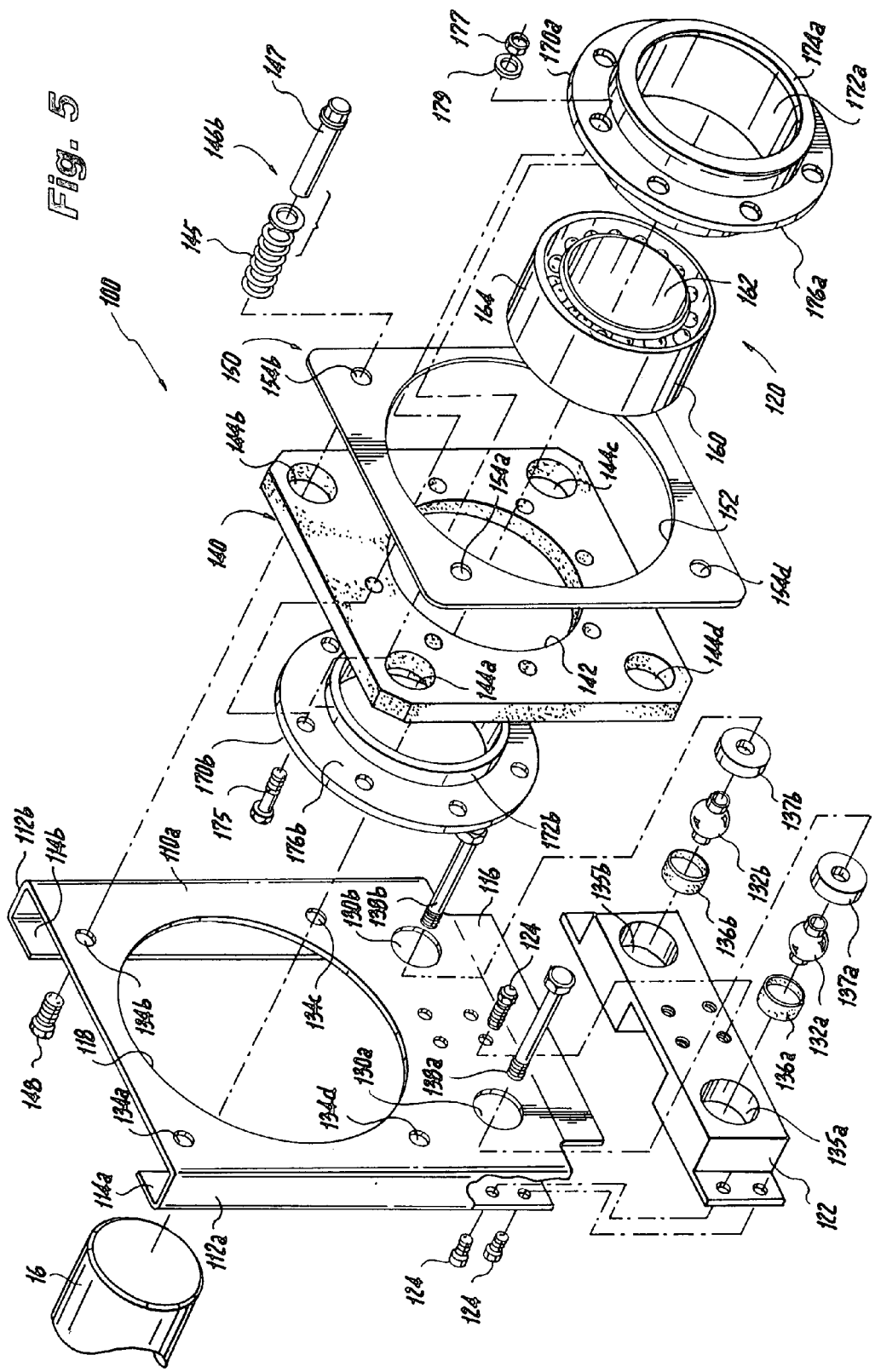
FIG. 5 is an exploded perspective view of the radially compliant bearing hanger of the subject invention, with parts separated for ease of illustration.

Referring to FIGS. 3 through 5, bearing hanger assembly 100 includes a primary support housing 110 formed from a lightweight sheet metal, such as, for example, aluminum, stainless steel or a similar material. Support housing 110 includes a front face plate 110a, rearwardly extending side walls 112a, 112b, inwardly projecting rear flanges 114a, 114b, and a bendable bottom wall 116 depending from the lower edge of front face 110a. The front faceplate 110a includes a primary support aperture 118 for accommodating an anti-friction or friction-less bearing assembly, and more particularly, a ball or roller bearing assembly 120, which is described in further detail below. Faceplate 110 further includes two secondary support apertures 130a, 130b for receiving spherical bearings 132a, 132b, which will also be described in further detail below. Faceplate 110a also includes four corner apertures 134a-134d for receiving four tensioning screws 146a-146d, which are described in more detail below.

A means for mounting the bearing hanger includes a mounting block 122 formed from an aluminum alloy or similar material is associated with the lower portion of the bearing hanger 100 and two bearing apertures 135a, 135b accommodating spherical bearings 132a, 132b. More particularly, mounting block 122 is secured between the front faceplate 110a and the rear flanges 114a, 114b and is enclosed by the bottom wall 116. Four rivets 124 secure the mounting block 122 to face plate 110a, while two rivets 124 secure the mounting block 122 to each of the rear flanges 114a, 114b.

Bearing hanger assembly 100 further includes a planar damper element 140 constructed from a low friction, self-lubricating polymeric material, such as, for example, polytetrafluoroethylene (PTFE). Preferably, damper element 140 is formed from PTFE filled with graphite or a similar low friction filler material, and more preferably, it is formed from PTFE filled with a relatively small percentage of graphite, and most preferably the PTFE is filled with about 15% graphite.

Damper element 140 includes a primary bearing aperture 142 aligned with the primary support aperture 118 of face plate 110a, but having a lesser diameter than aperture support 118, for receiving and mounting anti-friction bearing assembly 120. Damper element 140 further includes four corner apertures 144a-144d for accommodating radial movement of the damper element relative to four respective tensioning screws 146a-146d, which are described in more detail below.

Bearing hanger assembly 100 further includes a damper plate 150 formed from a lightweight sheet metal, such as, for example, aluminum, stainless steel or a similar material. Damper plate 150 includes a primary support aperture 152, which is axially aligned with and of equal diameter to the primary support aperture 118 of faceplate 110a for accommodating roller bearing assembly 120. In addition, damper plate 150 includes four corner apertures 154a-154d for receiving the four tensioning screws 136a-136d.

Figure 6:
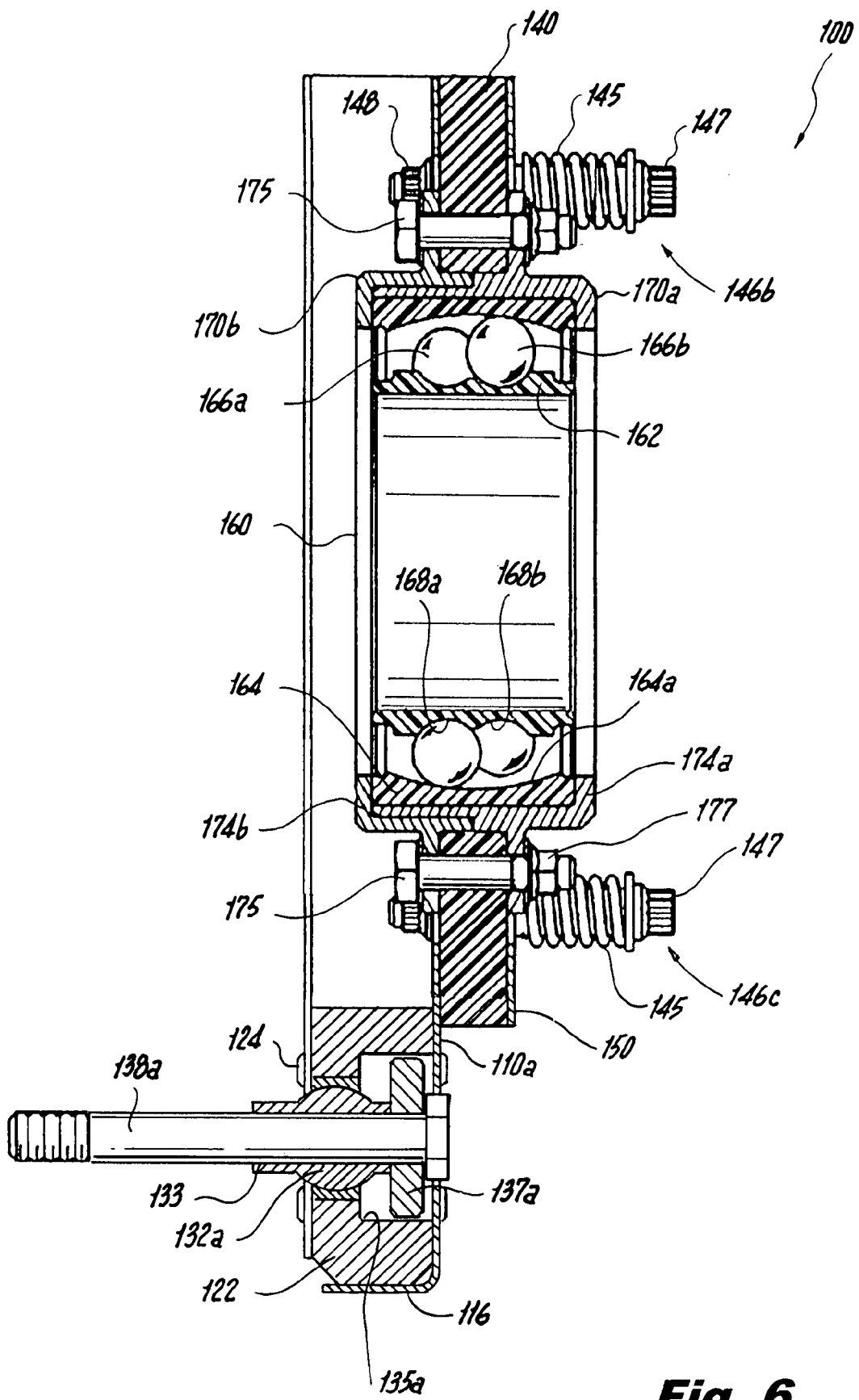
FIG. 6 is a cross-sectional view taken alone line 6-6 of FIG. 3.

Anti-friction bearing assembly 120 includes a bearing housing 160 having an inner race 162 and an outer race 164. As best seen in FIG. 6, two interposed sets of ball bearings 166a, 166b are seated within corresponding tracks 168a, 168b formed in the inner rolling surface 162a of inner race 162. In contrast, the inner rolling surface 164a of outer race 164 is crowned to allow relative angular movement between the inner and outer races 162, 164 of bearing housing 160. This structural relationship accommodates angular displacement of drive shaft 16 relative to bearing hanger assembly 100, as shown for example in FIG. 12.

Anti-friction bearing assembly 120 further includes front and rear mounting flanges 170a and 170b for securing bearing housing 160 to damper element 140. More particularly, front mounting flange 170a includes a sleeve body 172a having a circumferential retaining lip 174a for receiving and retaining the bearing housing 160, and an annular flange 176a for securing the front mounting flange 170a to the front face of damper element 140 by way of a plurality of fasteners 175, nuts 177 and washers 179, as depicted more clearly in FIG. 6. Similarly, rear mounting flange 170b includes a sleeve body 172b having a circumferential retaining lip 174b for receiving and retaining the bearing housing 160, and an annular flange 176b for securing the rear mounting flange 170b to the front face of damper element 140 by way of threaded fasteners 175, nuts 177 and washers 179.

Figure 12:
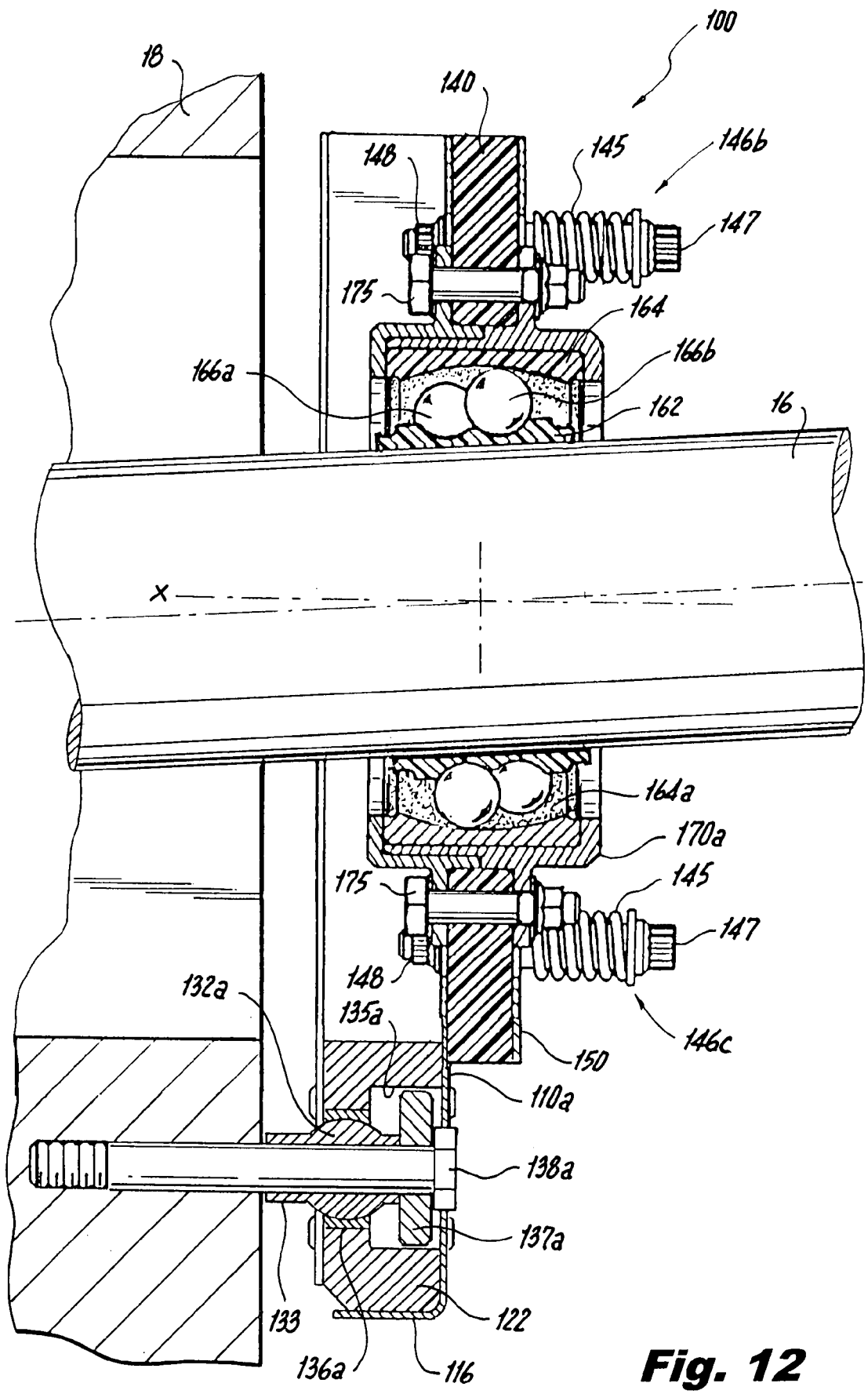
FIG. 12 is a side elevational view in cross-section of the bearing hanger assembly of the subject invention, wherein the spherical bearing mounts and the roller bearing assembly are shown in a position to accommodate the angular misalignment of the drive shaft.

Those skilled in the art will readily appreciate that other types of shaft bearings can be employed with bearing hanger assembly 100 instead of a ball or roller bearing assembly. For example, an anti-friction or fiction-less bearing having a flat running surface can be utilized herein, and such a bearing can have a spherical outer diameter seated in a manner to accommodate angular movement of the shaft 16, as shown in FIG. 12.

Figure 7:
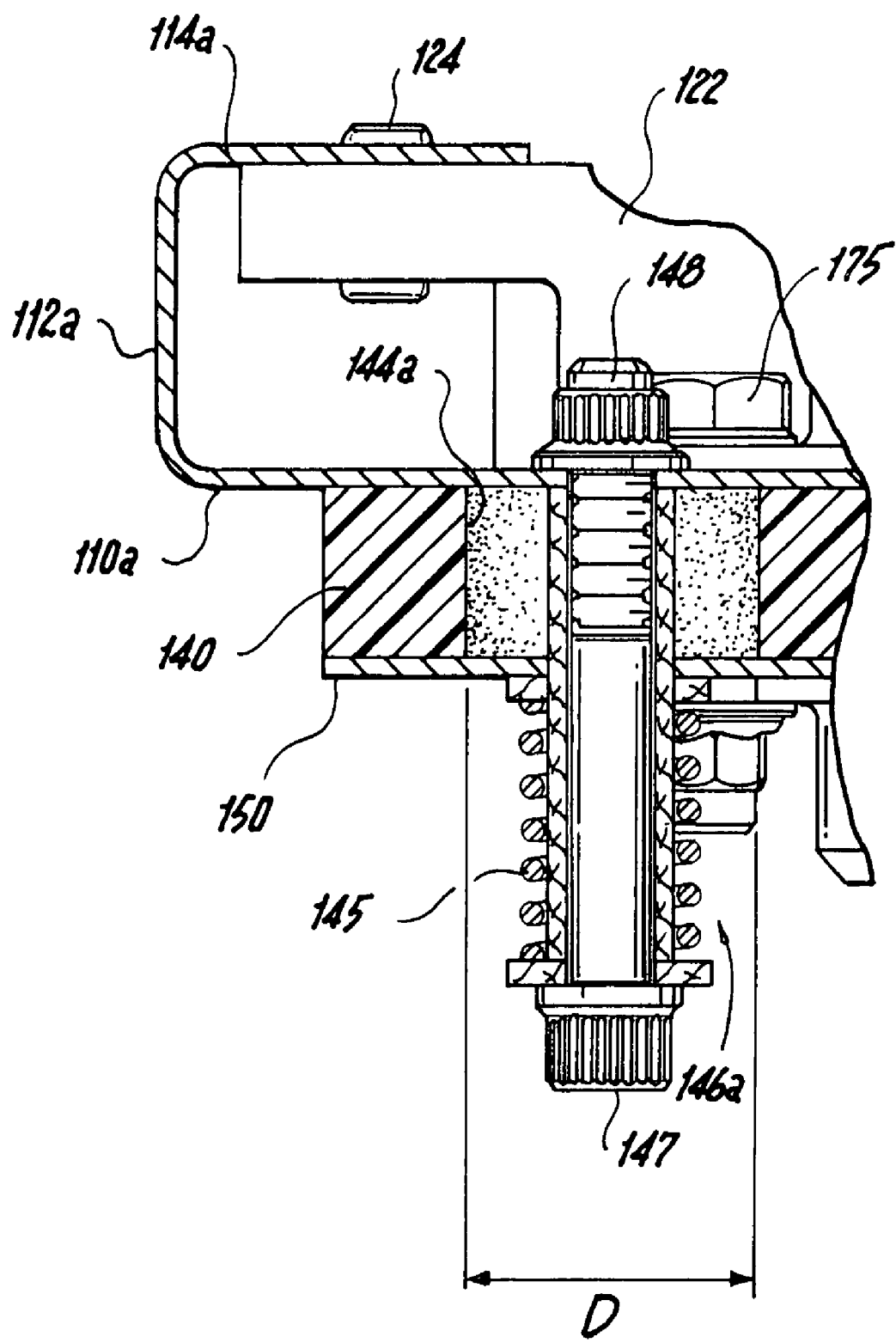
FIG. 7 is a localized cross-sectional view taken alone line 7-7 of FIG. 3.

As mentioned above, bearing hanger assembly 100 includes four spring loaded tensioning screw mechanisms 146a-146d adapted and configured to compressively clamp damper element 140 between the front surface of face plate 110a and the rear surface of damper plate 150. As best seen in FIG. 7, the tensioning screw mechanisms 146a-146d each include a coiled biasing spring 145 supported on an internally threaded sleeve 147 that allows for adjustable resistance of the damper element 140 to radial movement by way of adjusting threaded bolt 148 to increase or decrease the degree of plate compression. In addition, the radial clearance between the tensioning screw mechanisms 146a-146d and the four respective corner apertures 144a-144d limits the amount of travel of the damper element 140 in the radial direction. More particularly, apertures 144a-144d each have a diameter D sized to limit radial travel of damper element 140 between faceplate 110a and damper plate 150.

As mentioned above, bearing hanger assembly 100 includes two spherical bearings 132a, 132b, which accommodate angular movement of the bearing hanger in conjunction with anti-friction bearing assembly 120. Each spherical bearing 132a, 134b is retained in a seating ring 136a, 136b and supported on a threaded mounting bolt 138a, 138b. Flat washers 137a, 137b are provided between the bolts 138a, 138b and the bearings 132a, 132b. The threaded mounting bolts 138a, 138b secure the bearing hanger assembly 100 to a bulkhead 18 in the airframe of helicopter 10, as best seen in FIG. 2. Spacers 133 are supported on mounting bolts 138a, 138b to maintain a stand-off distance between the rear flanges 114a, 114b of support housing 110 and the bulkhead 18.

Figure 10:
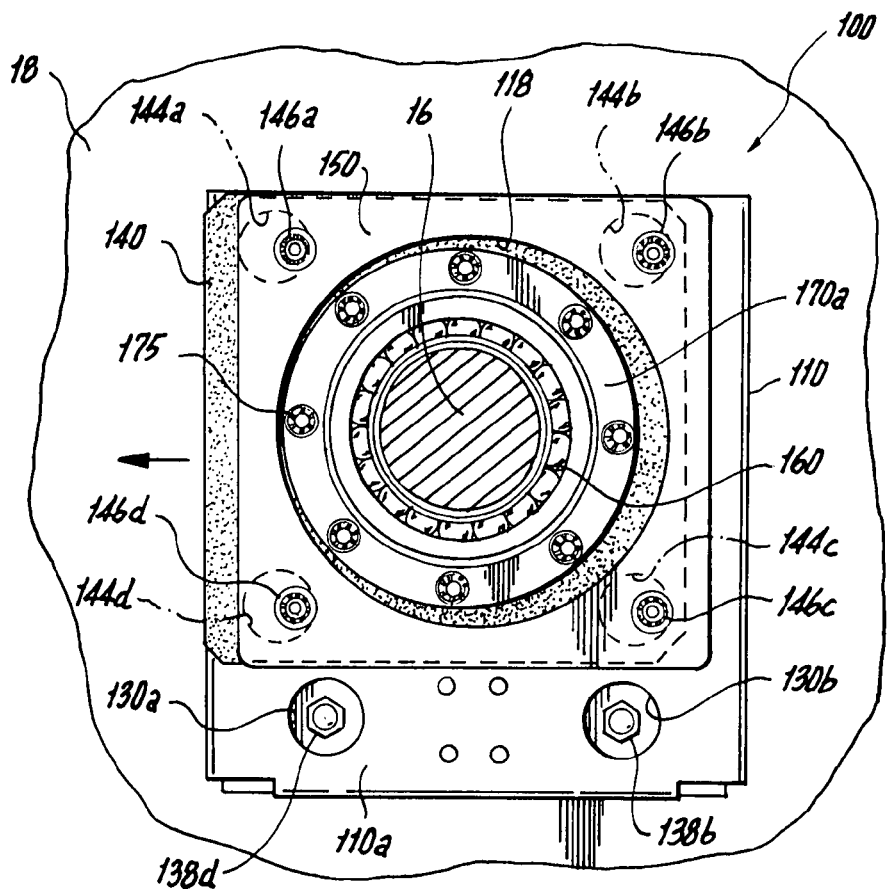
FIG. 10 is a plan view taken along line 10-10 of FIG. 8, illustrating the orientation of the damper element when the drive shaft is radially misaligned as in FIG. 8.

Referring now to FIG. 8, as compared to FIG. 2, the drive shaft 16 is shown in a radially displaced position. That is, the shaft 16 is misaligned from its normal position in FIG. 2. In accordance with the subject invention, the two bearing hangers 100 function to accommodate this off-axis radial movement of the shaft 16. In particular, as illustrated in FIGS. 9 and 10, the damper element 140 and associated anti-friction bearing housing 160 are shifted in a radial direction relative to the support plate 110 and damper plate 150 between which the damper element is compressively retained.

Figure 11:
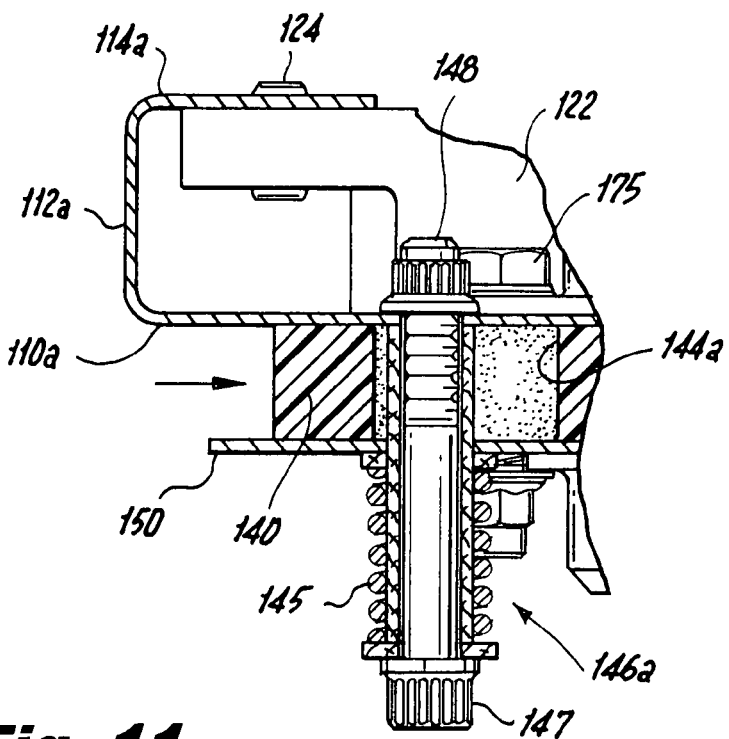
FIG. 11 is a localized cross-sectional view taken alone line 11-11 of FIG. 9 illustrating the position of the clearance opening in the damper plate relative to the tensioning screw.

As best seen in FIG. 11, this radial movement or shifting of the low-friction damper element 140 is physically limited by the structural interaction of the sleeve 147 of tensioning screw mechanism 146a. Additionally, one or more of the four tensioning screw mechanism 146a-146d can be selectively adjusted to vary the degree to which the damper element 140 is compressed or otherwise sandwiched between the front surface of faceplate 110a of support plate 110 and the rear surface of damper plate 150.

Referring now to FIG. 12. in situations wherein drive shaft 16 is angularly misaligned or displaced with respect to the normal longitudinal axis X thereof, the inner race 162 of anti-friction bearing housing 160 accommodates such movement. More particularly, the crowned inner surface 164a permits the anti-friction bearings 166a, 166b retained in tracks 168a, 168b to shift or rotate together with the inner race 162. As described above, this same angular displacement can be accommodated by a friction-less bearing having a flat inner running surface and a spherical outer diameter.

While the apparatus of the subject invention has been shown and described with reference to preferred embodiments, those skilled in the art will readily appreciate that changes and/or modifications may be made thereto without departing from the spirit and scope of the subject invention as defined by the appended claims.

What is claimed is:

1. A bearing hanger assembly for supporting a shaft comprising:
    a) a support housing including a face plate having opposed first and second surfaces and a shaft aperture extending therethrough;
    b) a damper plate having opposed first and second surfaces and a shaft aperture extending therethrough;
    c) a damper element disposed between the first surface of the face plate and the second surface of the damper plate, the damper element having a bearing aperture axially aligned with the shaft apertures of the face plate and damper plate, wherein the damper element is clamped between the face plate and the damper plate for radial movement relative to the damper plate and face plate by overcoming frictional resistance between the damper element and the damper plate and face plate to accommodate radial movement of a shaft supported in the bearing aperture; and
    d) a plurality of adjustment fasteners mounted to the support housing to selectively adjust resistance of the damper element to radial movement, wherein each adjustment fastener passes through a respective aperture in the damper element that is larger in diameter than the respective adjustment fastener passing therethrough to accommodate radial movement of the damper element relative to the adjustment fasteners.

2. A bearing hanger assembly as recited in claim 1, further comprising a bearing assembly mounted to the damper element within the bearing aperture to support rotational movement of a shaft supported therein.

3. A bearing hanger assembly as recited in claim 2, wherein the bearing assembly comprises a ball bearing assembly.

4. A bearing hanger assembly as recited in claim 3, wherein the ball bearing assembly includes an inner race and an outer race, and wherein the outer race is adapted and configured to allow relative movement of the inner race to accommodate angular movement of a shaft supported therein.

5. A bearing hanger assembly as recited in claim 1, wherein the adjustment fasteners are each threaded and spring-loaded.

6. A bearing hanger assembly as recited in claim 1, further comprising means for mounting the support housing to a supporting structure.

7. A bearing hanger assembly as recited in claim 6, wherein the mounting means includes spherical bearings for accommodating movement of the support housing relative to a supporting structure.

8. A bearing hanger assembly as recited in claim 7, wherein the mounting means further includes a mounting block fastened to the support housing and adapted to retain the spherical bearings.

9. A bearing hanger assembly as recited in claim 1, wherein the damper element is formed from a self-lubricating polymeric material.

10. A bearing hanger assembly as recited in claim 9, wherein the damper element is formed from PTFE.

11. A bearing hanger assembly as recited in claim 9, wherein the damper element is formed from PTFE filled with graphite.

12. A bearing hanger assembly for supporting a shaft comprising:
    a) a support housing including a face plate having opposed first and second surfaces and a shaft aperture extending therethrough;
    b) a damper plate having opposed first and second surfaces and a shaft aperture extending therethrough;
    c) a planar damper element disposed between the first surface of the face plate and the second surface of the damper plate, the damper element having a bearing aperture axially aligned with the shaft apertures of the face plate and damper plate;
    d) a bearing assembly within the bearing aperture of the damper element for supporting a shaft, wherein the damper element is clamped between the face plate and the damper plate for radial movement relative to the damper plate and face plate by overcoming frictional resistance between the damper element and the damper plate and face plate to accommodate radial movement of the shaft; and
    e) a plurality of adjustment fasteners mounted to the support housing to selectively adjust resistance of the damper element to radial movement, wherein each adjustment fastener passes through a respective aperture in the damper element that is larger in diameter than the respective adjustment fastener passing therethrough to accommodate radial movement of the damper element relative to the adjustment fasteners.

13. A bearing hanger assembly as recited in claim 12, wherein the bearing assembly comprises a ball bearing assembly.

14. A bearing hanger assembly as recited in claim 13, wherein the ball bearing assembly includes an inner race and an outer race, and wherein the outer race is adapted and configured to allow relative movement of the inner race to accommodate angular movement of the shaft.

15. A bearing hanger assembly as recited in claim 12, wherein the adjustment fasteners are each threaded and spring-loaded.

16. A bearing hanger assembly as recited in claim 12, further comprising means for mounting the support housing to a supporting structure.

17. A bearing hanger assembly as recited in claim 16, wherein the mounting means includes spherical bearings for accommodating movement of the support housing relative to a supporting structure.

18. A bearing hanger assembly as recited in claim 17, wherein the mounting means further includes a mounting block fastened to the support housing and adapted to retain the spherical bearings.

19. A bearing hanger assembly as recited in claim 12, wherein the damper element is formed from a self-lubricating polymeric material.

20. A bearing hanger assembly as recited in claim 19, wherein the damper element is formed from PTFE filled with graphite.

* * * * *